United States Patent [19]

Ittner

[11] Patent Number: 5,664,027
[45] Date of Patent: Sep. 2, 1997

[54] METHODS AND APPARATUS FOR INFERRING ORIENTATION OF LINES OF TEXT

[75] Inventor: David Jack Ittner, Manalapan, N.J.

[73] Assignee: Lucent Technologies Inc., Murray Hill, N.J.

[21] Appl. No.: 368,259

[22] Filed: Jan. 3, 1995

Related U.S. Application Data

[63] Continuation of Ser. No. 49,924, Apr. 20, 1993, abandoned.

[51] Int. Cl.$^6$ ............................................................. G06K 9/36
[52] U.S. Cl. .................... 382/170; 382/202; 382/259; 382/289
[58] Field of Search .............................. 382/170, 199, 382/258, 259, 200, 204, 202, 289; 345/126; 358/583; 395/137

[56] References Cited

U.S. PATENT DOCUMENTS 4,866,784  9/1989  Barski ........................................... 382/46

FOREIGN PATENT DOCUMENTS 308673A  3/1989  European Pat. Off. ............ G06K 9/32

OTHER PUBLICATIONS

European Patent Application No. 91306301.2 published on 13 May 1992, publication No. EP-A-0-485-051-A2.

D. J. Ittner, "Automatic Inference of Texline Orientation", Proceedings Second Annual Symposium on Document Analysis and Information Retrieval, Apr. 26, 1993, Las Vegas, NV, pp. 123-133.

A. Hashizume, et al, "A Method of Detecting the Orientation of Aligned Components", Pattern Recognition Letters, vol. 4, pp. 125-132 (1986).

Fortune, S. "A Sweepline Algorithm for Voronoi Diagrams", Algorithmica, Vo. 2, pp. 153-174 (1987).

H. Baird, "The Skew Angle of Printed Documents", Advanced Printing of Symp. Summaries, SPSE's 40th Annual Conf. and Symp. on Hybrid Imaging Systems, May 20-21, 1987, Rochester, NY, pp. 21-24.

D. Cheriton, et al. "Finding Minimum Spanning Trees", Siam J. Comput., Vo. 5, No. 4, pp. 724-742 (1976).

H. S. Baird, "Anatomy of a Versatile p. Reader", Proceedings of the IEEE, vol. 80, No. 7, pp. 1059-1065, Jul. 1992.

L. O'Gorman, "The Document Spectrum for p. Layout Analysis", accepted for publication in IEEE Trans. on Pattern Analysis and Machine Intelligence 1993.

Primary Examiner—Leo Boudreau
Assistant Examiner—Chris Kelley
Attorney, Agent, or Firm—Gordon E. Nelson

[57] ABSTRACT

The techniques for determining the orientation of lines in images disclosed herein take as their starting point an apparently universal typesetting convention: that symbols are generally closer to other symbols in the line to which they belong than they are to symbols in other lines. The techniques make a graph by connecting symbols in an image of a block of text with edges (lines) and then determine the predominant orientation of the shortest edges. Because the symbols in a line are closer to each other than to symbols in other lines, the predominant orientation of the shortest edges will be the same as the orientation of the lines. An advantageous mode of obtaining the shortest edges is to construct a Euclidean minimum spanning tree from the graph. A Euclidean minimum spanning tree of a graph contains all the nodes (symbols) of the original graph but connects the nodes with the shortest possible set of edges. The edges which predominate in the Euclidean minimum spanning tree are the shortest edges. Which edges predominate is determined by means of a histogram.

26 Claims, 7 Drawing Sheets

Segments 4, 7, and 8 contain points from more than one surface, However, all segments except number 4 were correctly classified by at least a 4.1 majority vote. Segment 4 contains 19 points from the left sphere and 30 points from the joining cylinder. It was classified as a cone by 3 and as a sphere by 2 of the individual classifiers. Since this does not pass our classifications thresshold, we normalized the segment and cluster the data a second time. The 2-cluster clustering once again perfectly partitions the points. The classification of the resulting segments is correct by a majority vote of at least 5, 1.

|  | | INFERRED | | |
|---|---|---|---|---|
|  |  | HORIZONTAL | VERTICAL | UNCERTAIN |
| CORRECT | HORIZONTAL | 762 | 5 | 34 |
|  | VERTICAL | 0 | 463 | 1 |
|  | UNCERTAIN | 4 | 17 | 42 |

METHODS AND APPARATUS FOR INFERRING ORIENTATION OF LINES OF TEXT

This application is a continuation of application Ser. No. 08/049924, filed Apr. 20, 1993 now abandoned.

1 BACKGROUND OF THE INVENTION

1.1 Field of the Invention

The invention relates generally to interpretation of images and specifically to determination of the orientation of lines of text.

1.2 Description of the Prior Art

An important area of image interpretation is optical character recognition, in which images of symbols are automatically translated into binary codes representing the symbols. A major problem in optical character recognition is determining the proper orientation of the symbols. The problem can occur in three contexts: first, the user of the optical character recognition apparatus (OCR) can fail to properly align a page of text as he places it on the platen of the imaging component of the OCR. Second, the OCR, may be employed to deal with texts written with their lines in different orientations. For instance, a page of English may be in landscape style, with the lines running in the long direction of the page, or may even have lines written vertically. Some writing systems require vertical lines; in others the lines may be written vertically or horizontally. Finally, a single page may have components in which the lines are oriented in different directions. In all of these situations, the OCR system cannot begin interpreting the symbols of the text until it has determined the orientation of the lines which contain them.

Prior techniques for determining the orientation of lines have fallen into two classes:

1. those which begin with a prior determination of the nominal orientation of the lines and attempt to correct only for alignment errors made by the users and
2. those which determine the orientation of the lines without prior assumptions.

An example of the first type of technique may be found in U.S. Pat. No. 5,001,766, H. S. Baird, *Apparatus and Method for Skew Control of Document Images*, issued Mar. 19, 1991. Examples of the second type of technique are found in L. O'Gorman, "The Document Spectrum for Page Layout Analysis," in: *Int'l Association for Pattern Recognition Workshop on Structural and Syntactic Pattern Recognition*, 1992 and in Akihide Hashizume, et al., "A method of detecting the orientation of aligned components", in: *Pattern Recognition Letters*, April 1986.

The first type of technique requires human intervention if the OCR system is dealing with documents having more than one kind of line orientation; prior-art versions of the second type of technique have not worked well in difficult cases. One such difficult case has been documents written with character sets having multiple connected components. Examples of such character sets include Chinese ideograms, the Korean Hangul alphabetic script, or heavily-accented writing systems such as Thai. These problems are overcome by the techniques described below. The techniques permit OCR, systems to automatically handle pages having blocks of text with different orientations. Moreover, the techniques work well with character sets having multiple connected components.

2 SUMMARY OF THE INVENTION

The novel techniques take as their starting point an apparently universal typesetting convention: that symbols are generally closer to other symbols in the line to which they belong than they are to symbols in other lines. The techniques make a graph by connecting symbols in an image of a block of text with edges (lines) and then determine the predominant orientation of the shortest edges. Because the symbols in a line are closer to each other than to symbols in other lines, the predominant orientation of the shortest edges will be the same as the orientation of the lines. An advantageous mode of obtaining the shortest edges is to construct a Euclidean minimum spanning tree from the graph. A Euclidean minimum spanning tree of a graph contains all the nodes (symbols) of the original graph but connects the nodes with the shortest possible set of edges. The edges which predominate in the Euclidean minimum spanning tree are the shortest edges.

Other objects and advantages of the apparatus and methods disclosed herein will be apparent to those of ordinary skill in the art upon perusal of the following Drawing and Detailed Description, wherein:

3 BRIEF DESCRIPTION OF THE DRAWING

Reference numbers in the Drawing have two parts: the two least-significant digits are the number of an item in a figure; the remaining digits are the number of the figure in which the item first appears. Thus, an item with the reference number 201 first appears in FIG. 2.

4 DETAILED DESCRIPTION OF A PREFERRED EMBODIMENT

The following Detailed Description will begin with an introduction to OCR systems and a discussion of the problem of language dependence in OCR systems and will thereupon present the techniques employed in the present invention to solve the problem.

4.1 OCR Systems

It is the task of an OCR system to translate images of symbols into digital codes representing the symbols. For example, an OCR is able to translate the image "A" into the ASCII code for capital A, 065. An OCR system has two main components, one which makes the images, and one which analyzes them. The image making component typically makes bit-map images of pages of text; the analysis component then dissects the image of a page into areas of text, the areas of text into lines, the lines into words, and the words into images of what appear to be symbols. Thereupon, it determines what symbol, if any, correspond to the image of the symbol and places the digital code for the symbol at a position in a file which corresponds to the position of the image of the symbol in the document to which the page belongs.

There are many ways of doing the image analysis. A failing of many techniques is that they are language-dependent. For example, they may assume that lines of text are horizontal, that words are divided by spaces, and that the letters of a word are for the most part separate from each other. An image analysis component which employs such assumptions will work well with images of texts printed using Western alphabets, but will fail utterly when presented with images of texts printed with Chinese ideograms or the Korean Hangul alphabet. Clearly, the less language-dependent an OCR system is the better. Manufacturers of OCR systems want systems that can be used anywhere in the world without modification; customers want systems which can handle texts printed in various writing systems without human intervention.

An important part of the problem of making a language-independent OCR system is determining how the lines of text in the image are oriented. For instance, the OCR system will not work if it cannot detect that the lines of a Chinese text are oriented vertically instead of horizontally. Determining how the lines of text are oriented is important in other contexts as well; an OCR system which can determine the orientation of lines of text can read text printed in landscape mode (with the text lines being oriented along the long dimension of the page) and can correct for skewed placement of a page onto the image producing part of the OCR.

4.2 Automatic Determination of Line Orientation

Figure 2A:
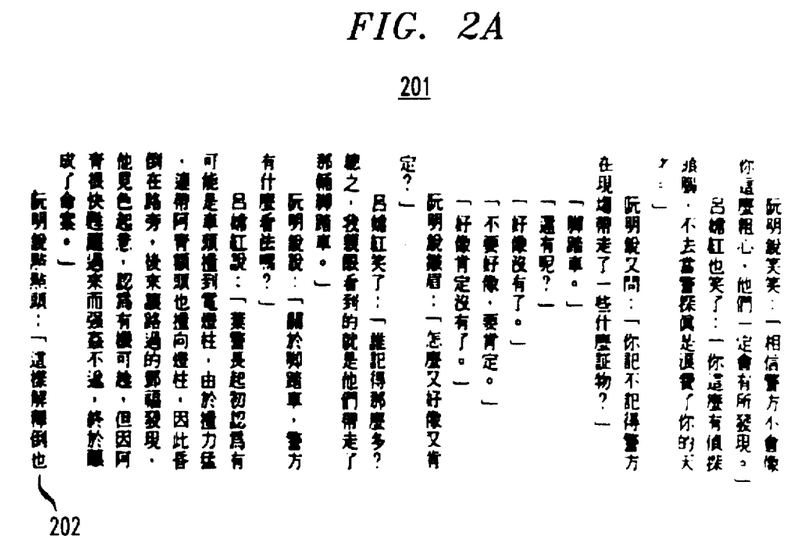
FIG. 2 shows an application of the invention to a text written in Chinese ideograms.
Figure 2B:
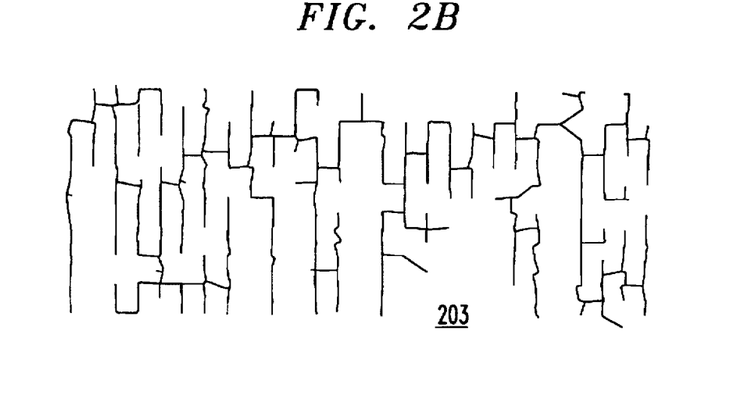
Figure 2C:
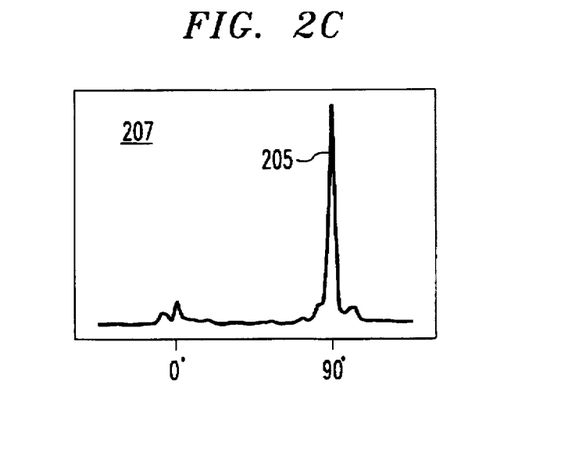

The solution to the problem of automatic determination of line orientation disclosed herein has as its starting point an apparently universal type setting convention: that characters are printed more tightly within a text line than between text lines. Because of this convention, even a person who knows no Chinese whatever can easily determine that the lines 202 in Chinese text 201 shown in FIG. 2 are oriented vertically. The disclosed solution exploits this convention by examining distance relationships among connected components in the image. The technique uses computational geometry algorithms to achieve a worst-case asymptotic runtime of $O(n \log n)$, where n is the number of black connected components in the block image.

Figure 3:
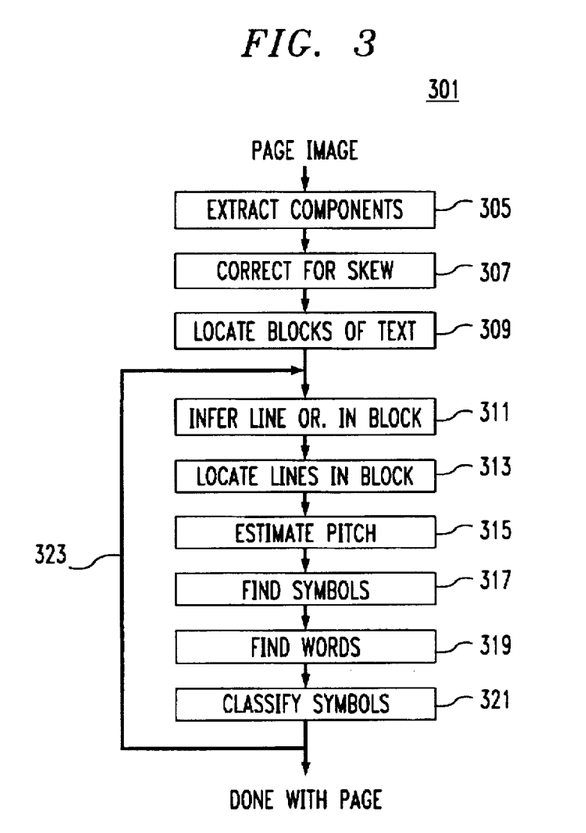
FIG. 3 is a flowchart of processing in an OCR employing the invention.
Figure 4A:
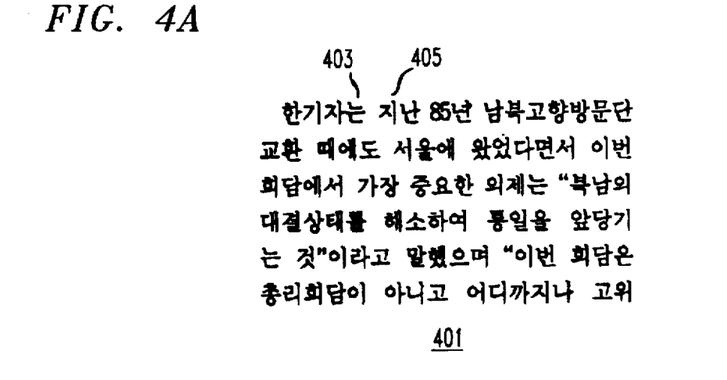
FIG. 4 shows an application of the invention to text in Hangul.
Figure 4B:
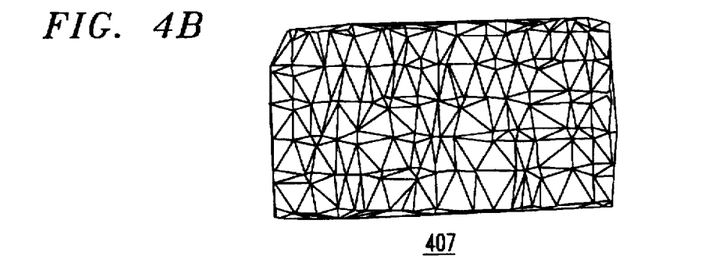
Figure 4C:
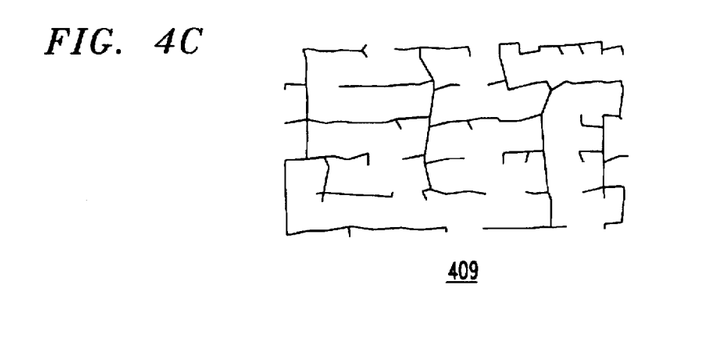
Figure 4D:
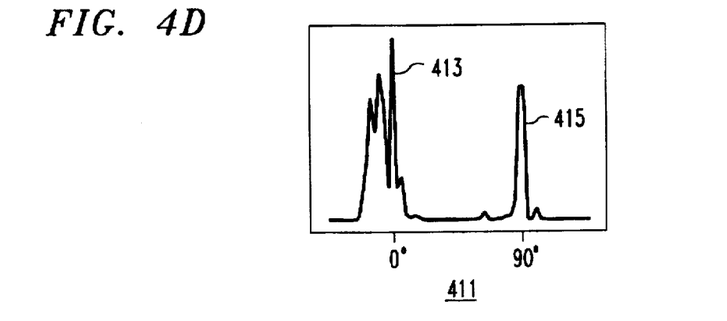

FIG. 3 shows the stages of image analyzer 301 in an OCR which employs the technique. The technique is applied in block 311, after 8-connected components have been located in the image (305), the image has been corrected for skew (307), and the image has been subdivided into blocks of text 309. In the preferred embodiment, the skew correction is required for the subdivision of the image into blocks of text; in other embodiments, it may be delayed until after the line orientation has been determined. Techniques for locating 8-connected components, correcting for skew, and subdividing an image into blocks of text are well known in the art. See for example H. Baird, "Anatomy of a Versatile Page Reader", *Proceedings of the IEEE*, Vol. 80, no. 7, pp. 1059–1065, July, 1992. Because the technique is applied at this point, it can be used with images in which the text lines are oriented in different directions in different parts of the image. Text having this characteristic is common in Japanese and Chinese and may also be found in other languages.

The technique takes as its input a list of the connected components in the block for which the orientation of the text lines is being determined. In a preferred embodiment, the list element for each connected component contains two items: a bounding box which locates the connected component in the image and the area of the connected component, that is, the number of black pixels in the connected component. The only assumption which the technique makes about the connected components is that the characters of the writing system are nominally detached (for example Japanese, Chinese, Korean). It is not necessary that a character of the writing system be comprised of a single glyph or that the symbol be at any particular orientation with regard to the line. For example, the technique will work with vertical lines of English text which have upright characters and are meant to be read from top to bottom and with vertical lines of text which are in fact lines of text written in landscape style (i.e., meant to be read horizontally with the page rotated 90°).

The steps in the technique are:

1. filter very small and very large connected components,
2. idealize the remaining components as points in the plane,
3. construct the Euclidean minimum spanning tree (EMST) of the undirected graph defined by connecting all pairs of these points,
4. decide horizontal, vertical, or uncertain by analysis of the distribution of edge orientations in the EMST.

The intent of the first step is to ignore fragments that are much too large or small to be characters, based on a rough estimate of expected point sizes. This reduces problems caused by small spatially correlated noise such as lines of dirt fragments along page borders and gutters.

The next step reduces each connected component to a single point in the plane—we use the center of its bounding box. These points define vertices in a fully connected undirected graph; the edges of the graph are labeled with the distance between the points connected by the edge. As will be shown, there is no need to actually construct the fully-connected graph.

Most of the computation of the technique is due to step 3. The objective is to construct a Euclidean minimum spanning tree from the fully connected graph. A spanning tree connects every vertex in the graph, but has fewer edges than the full graph. A spanning tree is a Euclidean minimum spanning tree if the edges in the spanning tree are such that the sum of the distances which the edges represent is the minimum possible such sum. The EMST tends to connect vertices (i.e. connected components) from within the same textline, with a few edges joining components between textlines.

Inferring textline orientation is then a matter of finding the dominant orientation of the edges in the EMST. The preferred embodiment maintains a coarse histogram of edge orientation from 0° to 180° as edges are added to the tree (Section 4.3). Once the histogram is complete, the preferred embodiment sweeps over the histogram to find the column of the histogram which contains the largest energy. If sufficient energy is contained in a window with its center near 0° it is decided the text is organized into horizontal textlines; likewise, if the window is centered near 90°, vertical textlines are assumed; otherwise, the algorithm returns "uncertain". Note that the technique is tolerant of skew since it is not required that the edges be oriented exactly horizontally or vertically. Indeed, if it can be assumed that the text was intended to be horizontal or vertical, the technique can be used to detect and correct skew.

Once the block orientation has been determined, the lines in the block can be located (313), their pitch can be estimated (315), the letters in the lines can be located (317), the words in the lines can be located (319), and the letters can be classified to produce the corresponding digital codes (321). As shown by loop 323, steps 311–321 are repeated for each block of text. Techniques for performing steps 313–321 are well known in the art; in the OCR employing the technique described herein for determining the orientation of the lines in a block of text, all of the steps 315 through 321 will work on both horizontally and vertically oriented lines. Text is maintained in the OCR system according to the logical reading order for the particular language. System output is in this order, regardless of the orientation or reading direction of the original material.

Figure 1:
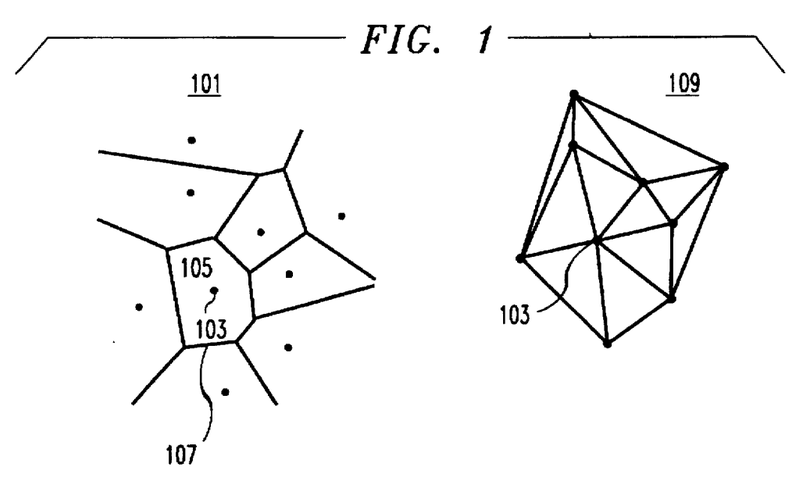
FIG. 1 shows a Voronoi diagram for a set of points and a Delaunay triangulation derived from the Voronoi diagram.

4.3 Construction of the Euclidean Minimum Spanning Tree: FIG. 1

The starting for the efficient construction of the EMST is two structures which are well known in the area of computational geometry. The first of these is the Voronoi diagram shown at 101 in FIG. 1. The Voronoi diagram for a set of points in a plane is produced by partitioning the plane into regions 105 regions such that for each point $p_i$ 103, there is a region defining the locus of points closer to $p_i$ than to any other point. The regions are defined by straight-line edges 107.

A Delaunay triangulation for a set of points is produced from the Voronoi diagram for the set of points by connecting the pairs of points whose regions share an edge. The Delaunay triangulation for Voronoi diagram 105 is shown at 107.

The Delaunay triangulation contains all edges of the EMST and no more than 3n–6 edges altogether (by planarity). This simplifies the problem of finding the EMST of a fully connected graph with $(n^2-n)/2$ edges to finding the EMST of the Delaunay triangulation which contains no more than 3n–6 edges. Algorithms to compute the Voronoi diagram and Delaunay triangulation have been studied for two decades. An asymptotically efficient algorithm described in S. Fortune, "Sweepline Algorithms for Voronoi Diagrams", *Algorithmica* 2, 1987 uses the sweepline technique and produces the Delaunay triangulation of a set of n points in the plane in time O(n log n). The algorithm is also efficient with respect to storage, requiring only O(n) space.

An algorithm for finding the EMST from the Delaunay Triangulation is given by Cheriton and Tarjan in "Finding Minimum Spanning Trees," SIAM *Journal of Computing*, 5(4), Dec. 1976. Their algorithm uses a data structure representing a forest of subtrees which are merged until a single tree remains (the EMST). They further proposed a strategy for the selection of the subtrees in such a way that when applied to the Delaunay triangulation, the EMST can be found in time linear in n. The initial queue of subtrees is the list of vertices, so it is easy to show the storage requirement of the algorithm is O(n).

These results together give an EMST algorithm running in O(n log n) time and O(n) space.

Figure 10A:
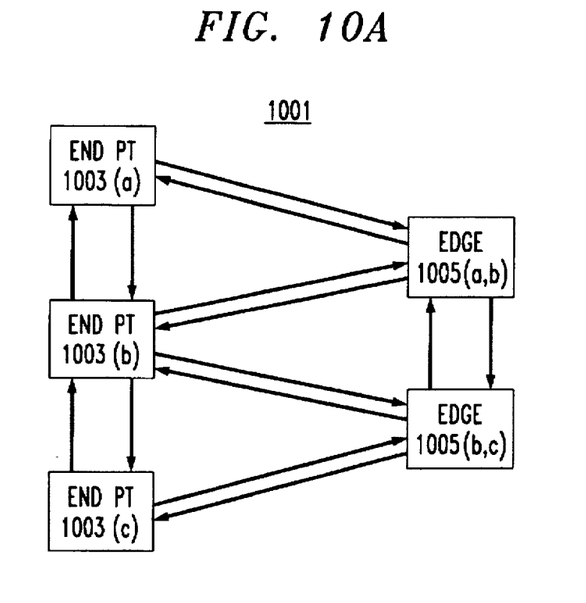
FIG. 10 shows the data structures used to represent a graph in the preferred embodiment.
Figure 10B:
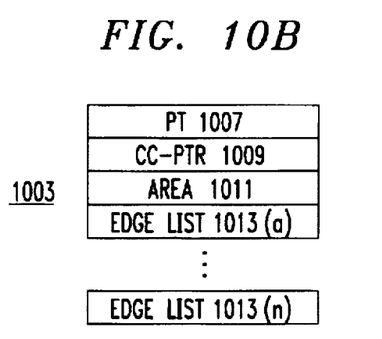
Figure 10C:
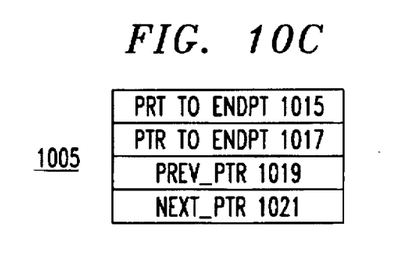

4.3.1 Representation of the Delaunay Triangulation in a Preferred Embodiment: FIG. 10

FIG. 10 shows the manner in which the Delaunay triangulation of the original graph is represented in the preferred embodiment. Triangulation data structure 1001 is made up of endpoint data structures 1003 and edge data structures 1005. There is an endpoint data structure 1003 for each connected component which remains after filtration, and there is an edge data structure 1005 for each edge in the triangulation. The endpoint data structures are organized into a linked list and there is a pointer in each endpoint data structure pointing to an edge data structure 1005 for each edge connecting the endpoint to other endpoints. The edge data structures themselves are organized into a linked list. Thus, both endpt data structure 1003(a) and endpt data structure 1003(b) have pointers to edge structure 1005 for the edge connecting the points represented by those endpt data structures.

FIG. 10 also shows the contents of the endpt data structure 1003 and of the edge data structure 1005. Endpt data structure 1003 includes pt 1007, which is the x and y coordinates of the point represented by endpt 1003; $cc_{13}ptr$ 1009, which is a pointer to the point's connected component in the list of connected components, area 1011, which is the area of the connected component, and an edge list entry 1013 for each edge connected to the point. The edge list entry 1013 is a pointer to the edge data structure 1005 for the edge. Edge data structure 1005 contains four pointers: pointers 1015 and 1017 to the endpt structures for the points connected by the edge, and previous pointer 1019 and next pointer 1021, which link the edge data structures into a linked list. In the preferred embodiment, the length and orientation of the edges are computed on the fly from the x and y coordinates of pt 1007 in the endpt data structures for the points connected by the edge represented by the edge data structure 1005.

4.3.2 Other Ways of Locating the Edges to be Analyzed

Techniques other than the computation of the EMST may be used to determine what edges of the graph made by connecting the components of the block are of interest in determining the orientation of the lines. The k-nearest neighbors (k-NN) is a long-popular technique in pattern recognition. Rather than finding the EMST in step 3 of our technique, we can find the k-NN for each point and examine the distribution of these edges in step 4.

Experiments with this technique have shown that k=1 does not provide enough information and that k≧4 provides too much data due to the edges which almost certainly connect distinct textlines. k=2 or k=3 produces reasonable results, in most cases comparable to computing the EMST. Interestingly, computing the EMST gives better results on proportionally spaced alphabetic text. The k-NN seems to cross textlines often due to the large fraction of wide connected components resulting from touching characters. This is an indication of the robustness of the EMST technique.

4.3.3 Analysis of the Distribution of Edge Orientations

The analysis is done by means of a histogram. In a preferred embodiment, the histogram has bins for each of the 5° intervals between 0° and 180°. If the technique is being used to detect skew, smaller intervals must be employed. While the simplest approach is to simply increment a counter for each bin each time an edge having the bin's orientation is found in the EMST, experiments have shown that it is helpful to put the sum of the areas (i.e., the number of black pixels in the connected component) of the connected components connected by the edge having the bin's orientation into the bin, instead of incrementing a counter. In this way the distribution is less influenced by small fragments of symbols which may result in edges at wild orientations. In order to determine the dominant orientation, the "energy" for each histogram bin is computed. The energy at histogram bin i is defined as $(b_i/\Sigma_j b_j)^2$, where $b_i$ is the value in bin i. This has the effect of sharpening peaks and dampening noise in the histogram.

In a preferred embodiment, whether the orientation of the lines is horizontal, vertical, or uncertain is determined from the histogram as follows: The embodiment sweeps a window of ±20° over the histogram and requires that 65% of the energy be contained in a single window in order for the orientation of the lines to be that specified in the window.

4.4 Examples: FIGS. 2, 4–6

The following examples will show how the technique that has just been described may be applied to texts written in Chinese ideograms, the Hangul script, and English. FIG. 2 shows a block 201 of text written in Chinese ideograms. The text is organized into columns 202. The edges of the EMST for block 201 may be seen at 203; as is immediately apparent, vertical edges predominate. That impression is confirmed by histogram 207, which shows a strong peak 205 around 90°, confirming that the text is oriented vertically. It should be noted here that the fact that words are not delimited by spaces in text block 201 poses no difficulties whatever for the technique.

FIG. 4 shows an application to a block 401 of text written horizontally in the Hangul script. Hangul is the native alphabet used to write the Korean language. Hangul has only 24 letters which are combined in a two-dimensional fashion to form composite Hangul symbols 403. Each composite symbol corresponds roughly to a syllable of the language. Often the individual letters of a syllable are detached and are therefore seen as multiple connected components (examples may be seen in symbol 403). Words in the language are delineated with white space 405 and since a composite is an entire syllable, words tend to be short (with respect to the composites). This results in a relatively large number of inter-word gaps which may be as large as inter-textline distances.

407 shows the Delaunay triangulation for the fully connected graph representing text block 401. Triangulation 407 contains 473 edges; the fully connected graph contains more than 13,000 edges. The resulting EMST is shown at 409; horizontal edges again prevail, but there is also a significant set of vertical edges. Histogram 411 for EMST 409 confirms the impression: there are two peaks, one, 415, around 90°, and a larger peak, 413, around 0°. Over 72% of the energy of histogram 411 is contained in peak 413, and consequently, the technique determines that the lines are oriented horizontally, which is the correct determination.

Figure 5A:
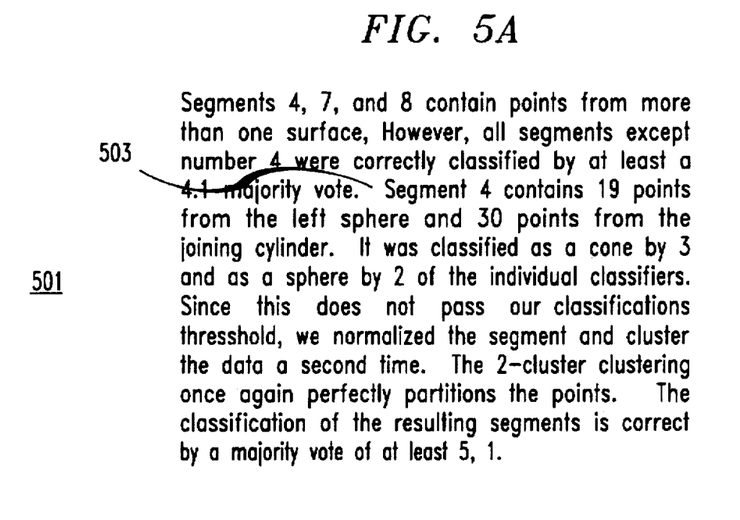
FIG. 5 shows an application of the invention to text in Latin letters.
Figure 5B:
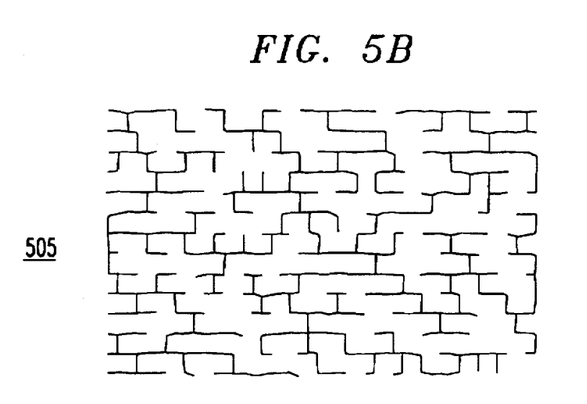
Figure 5C:
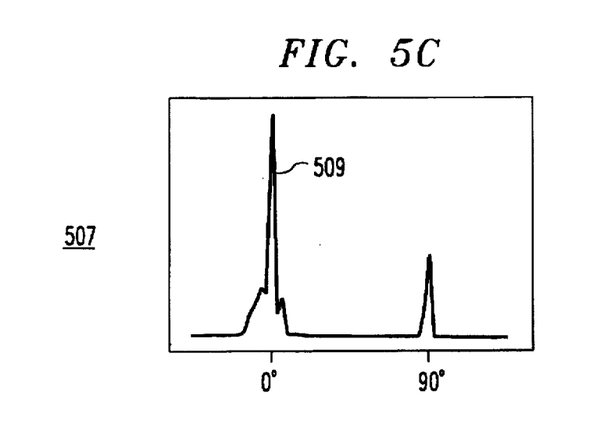

FIG. 5 shows the application of the algorithm to a block 501 of English text. The right justification and constant pitch font cause large, irregular inter-word gaps such as 503. The EMST for this block of text is shown at 505 and the histogram at 507. The large inter-word gaps result in a high percentage of inter-textline edges, but this is offset somewhat by the longer words of English. The orientation of EMST 505 is clearly dominantly horizontal, and over 80% of the energy in histogram 507 is contained in peak 509 within the window around 0°. Again, the technique makes the correct determination, which is that the text lines are horizontally organized.

Figures 6A, 6B:
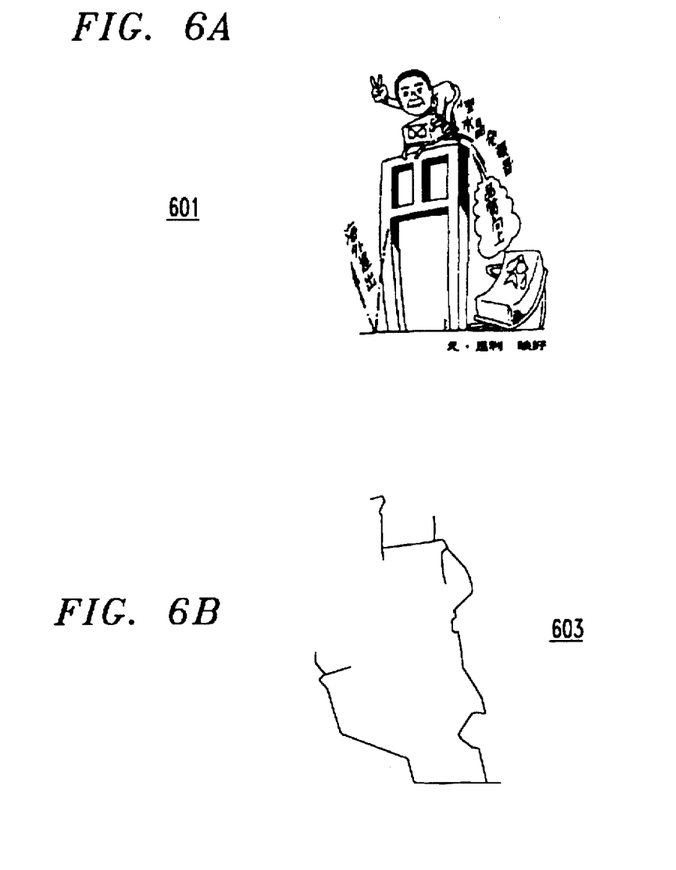
FIG. 6 shows an application of the invention to text without a predominant orientation.
Figure 6C:
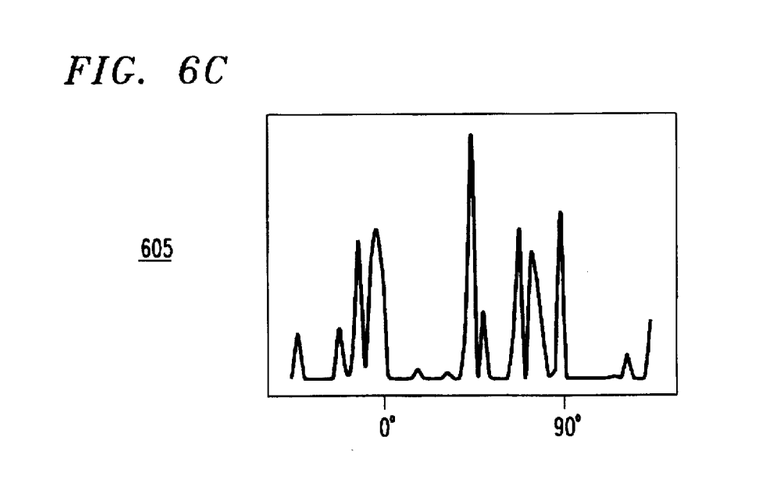

FIG. 6 shows a situation in which the technique determines that the orientation of the text lines is uncertain. The block 601 produced by the OCR's page segmentation algorithm contains a cartoon with lines of characters written at odd angles. (Our system does not attempt to separate text from non-text prior to this stage.) Also shown are the EMST 603 and edge histogram 605 produced by the technique. It is in this kind of situation that the filtration step of the technique is particularly useful, since it throws out several of the very large connected components. The window with maximum energy is centered near 60° and contains 45% of the energy. The algorithm returns "uncertain", leaving the decision of what to do with this block to higher level control.

Figure 7:
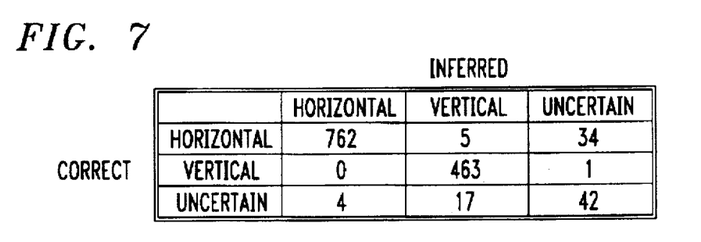
FIG. 7 shows a confusion table illustrating the performance of the invention.

5 Further Tests of the Technique: FIG. 7

The technique has been tested on a data base of over 100 pages of text written using writing systems with nominally-detached symbols and also has been tested on pages of text written using writing systems in which the symbols are not nominally detached.

5.1 Using the Technique with Detached Symbols

The test data base included text written using the following writing systems: Chinese, Danish, English, Japanese, Korean, Russian, Sinhalese, Thai, Tibetan, Ukrainian, Vietnamese, and Yiddish. Pages were selected with preference given to complex, multi-column layouts (e.g. newspapers). Pages with tabular data and line-graphics were accepted. FIG. 7 shows a confusion matrix summarizing results over all blocks produced by our page segmentation algorithms. Each row indicates the total number of blocks with lines having a given orientation; for example, there were 801 blocks whose lines were oriented horizontally. The correct orientation for each block was determined by hand. An answer of "uncertain" was the desired result when the algorithm was given a block of noise or fragments of a non-text region.

The vertical columns indicate the numbers of orientations inferred by the technique. Thus, in the case of the 801 horizontal blocks, the technique determined that 762 had horizontal lines, 5 had vertical lines, and 34 were uncertain. Overall, the technique deduced the correct orientation 95% of the time. The majority of the uncertain blocks incorrectly labeled vertical actually contained nothing but noise, typically located at the left and right margins of the page. These blocks tended to be tall and narrow, producing EMST edges oriented near 90°. Most of the horizontal blocks for which the algorithm was uncertain contained narrow columns of tabular data. The EMST edges between the few characters in each textline could not offset the edges joining textlines.

Ignoring for the moment blocks of noise, purely tabular data, and the rare case of a block of mixed orientation, there were a total of 638 horizontal and 447 vertical blocks of text within the 100 page images. There were no confusions among the orientations but 8 of the horizontal blocks and 1 vertical block were labeled uncertain (7 of the 8 horizontal errors were on Korean text). Overall, the technique correctly labeled 99% of the clean, non-tabular, text blocks.

5.2 Using the Technique with Non-detached Symbols

In the preferred embodiment, the technique is used with target writing systems whose characters are nominally detached from one another. The technique has also been tested on Arabic and Nepali written in the Devanagari script, two writing systems in which the characters making up a word are typically connected. The technique produced usable results with the Arablic examples, but did not work well with the Nepali text. In the Devanagari script, attached units are even longer than in Arabic, with more white space between units. One way of making the technique work better in these situations is to use the minimum distance between the bounding boxes as the label of an edge, rather than the Euclidean distance between the centers of the bounding boxes.

In the preferred embodiment, the technique relies entirely on the page segmentation algorithm to provide blocks of a single orientation. If page segmentation produces a block of mixed orientation, the technique returns the dominant orientation, or at best, an indication of uncertainty. One way of overcoming this problem is to analyze the structure of the EMST to verify all text is of the same orientation and to split text blocks when necessary.

Figure 8:
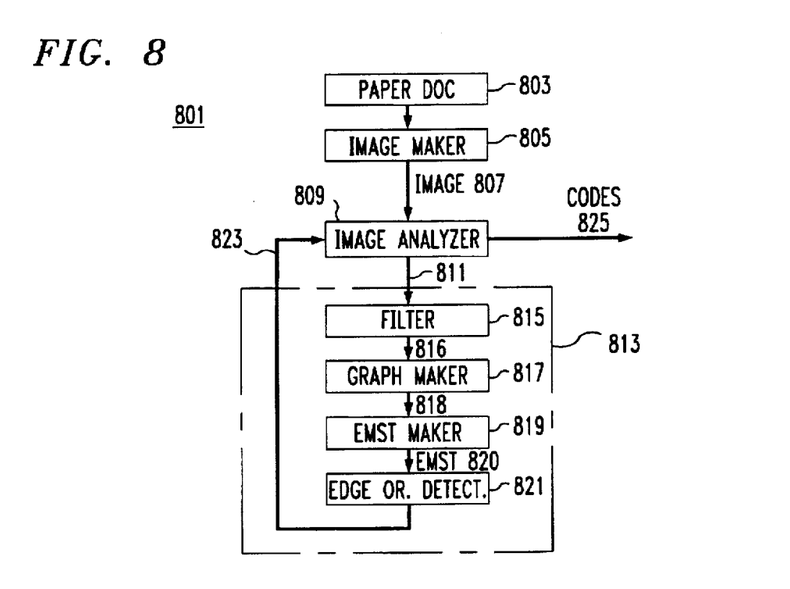
FIG. 8 is a block diagram of an image analysis system employing the techniques of the invention.

6 An OCR employing the Invention: FIG. 8

FIG. 8 is a block diagram of an OCR 801 which employs the invention. OCR 801 receives a paper document 803 in image maker 805, which produces image 807 from document 803. Image 807 goes to image analyzer 809, which performs the operations necessary to produce digital codes 825 representing symbols in paper document 803. A component of image analyzer 809 is orientation detector 813. Orientation detector 813 receives a list of connected components of a text block in image 807 from image analyzer 809 and returns an indication 823 of the orientation of the lines in the text block. In a preferred embodiment, the indication indicates whether the orientation of the lines in the text block is horizontal, vertical, or uncertain. Components of orientations detector 813 include filter 815, which produces filtered list 816 by removing connected components 811 from list 811 which are too large or too small to be symbols in lines of text, graph maker 812, which makes Delaunay triangulation 818 from filtered list of connected components 816, Euclidean minimum spanning tree maker 819, which makes EMST 820 from Delaunay triangulation 818, and edge orientation detector 821, which detects the dominant edge orientation in EMST 820 and outputs orientation indication 823. In a preferred embodiment, list 811, filtered list 816, Delaunay triangulation 818, EMST 820, and orientation indication 823 are all implemented as data structures which are stored in a memory in a computer system and filter 815, graph maker 817, EMST maker 820, and edge orientation detector 821 are all implemented in programs which are executed by the computer system.

7 Applications of Image Analyzer 809

As shown in FIG. 8, image analyzer 809 may be employed in a traditional optical character recognition system. However, the images processed by image analyzer 809 may come from other sources as well. One such source is a FAX machine, and image analyzer 809 could be used to produce codes 825 for the characters in a faxed document. Such a translation of a fax into codes 825 has many advantages: if the fax is to be kept in the computer system, it reduces the amount of storage required; further, a text in codes 825 may be searched, may be further edited, and may be incorporated into a text data base.

Figure 9:
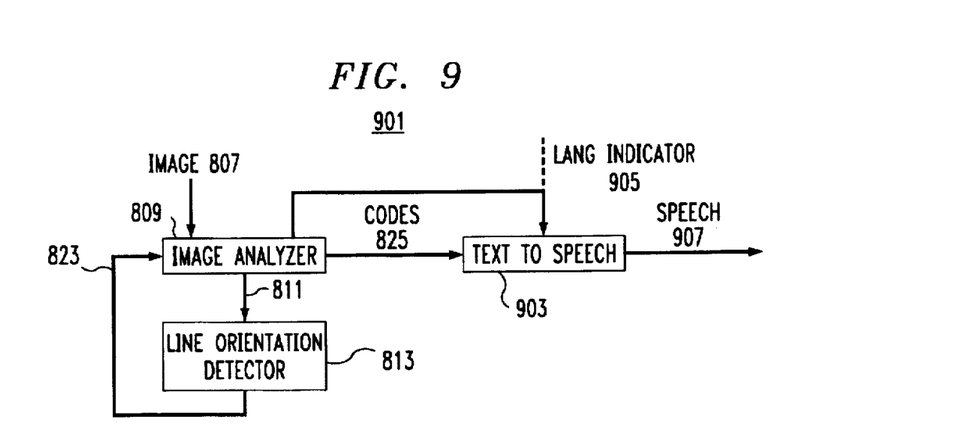
FIG. 9 shows how the image analysis system may be employed in an image reading system.

Once an image has been reduced to a text in codes 825, the codes may be input into a text to speech converter, and the image thus "read aloud" to a hearer. FIG. 9 is a block diagram of such an image reader 901. Image 807 is input to image analyzer 809 as before, and image analyzer 809 includes orientation detector 813 as before. Codes 825 are now output to text to speech converter 903, which produces speech 907 from the codes. Image reader 901 may handle documents in more than one language; in that case, text to speech converter 903 must include converters for different languages and a language indicator 905 must be provided to text to speech converter 903 to indicate which language the text is in. The source of language indicator 905 may be a human user of image reader 901, or it may be image analyzer 809. Image analyzer 809 can determine the language from the form of the symbols used, or in the case of writing systems such as the Latin alphabet, which are used for more than one language, can determine the language from the presence of characteristics such as diacritical marks or vocabulary items. Image reader 901 would of course be useful to any visually impaired person or to someone who was illiterate in the language concerned, but would also be useful in any situation where neither the image nor codes 825 can be provided directly to a recipient.

One such situation is when a document needs to be faxed to someone who has an ordinary telephone, but no fax machine. Telephone companies with intelligent switching systems can provide a read-a-fax service. In such a service, a user of a fax machine dials a special number such as an 800 number for the read-a-fax service, followed by the telephone number of the party to whom the fax is to be read. If image reader 901 is unable to itself determine the language of the fax, the user of the fax machine might also dial a code indicating the document's language. The user would then input the document to the fax machine. On receiving the image, image reader 901 would translate it into codes 825 as described above and store the codes. The telephone system then automatically dials the number of the party to whom the fax is to be read, and upon making a connection, provides the codes to text to speech converter 903, which outputs speech 907 over the connection to the party. Other variations are of course possible. For example, the telephone number of the party may be the number of his voice mail box, and when the party calls in to get his voice mail, codes 825 may be provided at that point to text to speech converter 903.

8 CONCLUSION

The foregoing Detailed Description has disclosed techniques to those of ordinary skill in the art which permit the detection of the correct orientation of lines of text in an image. The techniques are not restricted to the detection of the correct orientation of lines of text, but may be used to detect orientation in any situation where the distance between entities in a line is typically less than the distance between lines. The techniques may be used in conjunction with skew detection techniques to determine the orientation of lines in blocks of text or may itself be used to detect skew. Further, while a preferred embodiment of the techniques constructs a Euclidean minimum spanning tree and determines the orientation of the lines from the edges of the Euclidean minimum spanning tree, other techniques may be used to define graphs from which the orientation of the lines may be determined. Finally, the Detailed Description has shown how the techniques may be employed in one type of OCR system, but their use is not limited to that type of OCR system or to any type of OCR system. Instead, as indicated above, they are useful in any kind of image analysis system which requires detection of lines or columns of entities.

All of the above being the case, the foregoing Detailed Description is to be understood as being in every respect illustrative and exemplary, but not restrictive, and the scope of the invention disclosed herein is not to be determined from the Detailed Description, but rather from the claims, and the claims are to be given the full breadth permitted by the law.

What is claimed is:

1. A method practiced in image analysis apparatus including at least processing means and memory means of automatically determining the orientation of a line of entities in an image representation representing an image, the image representation being stored in the memory means and the method comprising the steps performed in the processing means of:

making a graph representation in the memory means which represents a graph in which the entities are connected with edges, said graph representation further specifying an area of each of the entities; modifying the graph representation to represent a minimum spanning tree of the graph the; and determining, based on the area of the entities and each of a plurality of edges in the minimum spanning tree, a dominant orientation of the edges of the minimum spanning tree and determining the orientation of the line from the dominant orientation.

2. The method set forth in claim 1 wherein:

the step of making a graph representation comprises the steps of reducing the entities to points; and connecting the points with the edges.

3. The method set forth in claim 1 further comprising the step of:

filtering very large and very small entities before making the graph representation.

4. The method set forth in claim 1 wherein:

the step of using the graph representation to determine a dominant orientation determines whether the orientation of the line is vertical, horizontal, or uncertain.

5. The method set forth in claim 1, 2, 3, or 4 wherein:

the step of modifying the graph representation includes the step of computing for an edge the distance in the image of the entities connected by the edge.

6. The method set forth in claim 1, 2, 3, or 4 wherein:

the step of using the graph representation to determine a dominant orientation includes the steps of:

making a histogram in the memory means which has bins for ranges of the orientations of the edges of the minimum spanning tree and specifies for each bin at least the number of the edges having orientations for that bin's range; and determining the orientation of the line from the histogram.

7. The method set forth in claim 6 wherein:

the step of making the histogram includes the step of modifying the contribution of each edge to the bin for the edge's orientation according to the area of the entities connected by the edge.

8. The method set forth in claim 6 wherein:

the step of using the graph representation to determine a dominant orientation includes the step of sharpening peaks and damping noise in the histogram.

9. The method set forth in claim 8 wherein:

the step of sharpening peaks and damping noise includes the step of defining the energy at histogram bin $b_i$ as $$\left( b_i / \sum_{j=1}^{j=h} b_j \right)^2 ,$$

where h is the number of bins in the histogram.

10. The method set forth in claim 9 wherein:

the step of using the graph representation to determine a dominant orientation further includes the step of determining that the orientation of the line is uncertain unless there is an orientation for which the percentage of the total energy in the histogram is above a predetermined threshold.

11. The method set forth in claim 1, 2, 3, or 4 wherein:

the entities are characters of a script.

12. The method set forth in claim 11 wherein:

the characters have multiple connected components.

13. The method set forth in claim 11 wherein:

the steps of the method are practiced in a system which assigns each character a digital code.

14. The method set forth in claim 13 wherein:

the system further converts the digital codes representing the characters into speech.

15. The method set forth in claim 11 wherein:

the method does not require a predetermined orientation of the characters to the line.

16. A method practiced in image analysis apparatus including at least processing means and memory means of automatically determining the orientation of a line of entities in an image representation representing an image, the image representation being stored in the memory means and the method comprising the steps performed in the processing means of:

making a graph representation in the memory means which represents a minimum spanning tree in which the entities are connected with edges such that a very high percentage of the entities are connected to fewer than four of the next nearest entities in the image, said graph representation further specifying an area of each of the entities; and determining, based on the area of the entities and each of a plurality of edges in the minimum spanning tree, a dominant orientation of the edges of the minimum spanning tree and determining the orientation of the line from the dominant orientation.

17. Image analysis apparatus which is implemented in a computer system which includes processor means and memory means and which includes means for determining the orientation of a line of entities in an image representation representing the image, the image representation being stored in the memory means and the means for determining the orientation of the line of entities comprising:

means implemented using the processor means for making a graph representation in the memory means representing a graph in which the entities are connected with edges, said graph representation further specifying an area of each of the entities;

means implemented using the processor means for modifying the graph representation to represent a minimum spanning tree of the graph; and means implemented using the processor means for determining, based on the area of the entities and each of a plurality of edges in the minimum spanning tree, a dominant orientation of the edges of the minimum spanning tree and determining the orientation of the line from the dominant orientation.

18. The apparatus set forth in claim 17 wherein the means for determining the orientation of a line of entities further comprises:

means implemented using the processor means for filtering very large and very small entities before making the graph representation.

19. The apparatus set forth in claim 17 wherein:

the means for using the graph representation to determine a dominant orientation determines whether the orientation of the line is vertical, horizontal, or uncertain.

20. The apparatus set forth in claim 17, 18, or 19 wherein:

the entities are characters of a script.

21. The apparatus set forth in claim 20 wherein:

the characters have multiple connected components.

22. The apparatus set forth in claim 20 wherein:

the apparatus is part of a system which assigns each character a digital code.

23. The apparatus set forth in claim 22 wherein:

the system further converts the digital codes representing the characters into speech.

24. The apparatus set forth in claim 20 wherein:

the apparatus does not require a predetermined orientation of the characters to the line.

25. The method set forth in claim 16 wherein:

the step of making a graph representation makes a graph representation which represents a minimum spanning tree.

26. The method set forth in claim 16 wherein:

the step of making a graph representation makes a graph representation in which the edges connect an entity with its 2 or 3 nearest neighbors.

* * * * *